US010183804B2

(12) United States Patent
Yielding et al.

(10) Patent No.: US 10,183,804 B2
(45) Date of Patent: Jan. 22, 2019

(54) TANK TRAILER HAVING INTEGRATED HEAT PANELS

(71) Applicant: Heil Trailer International, Co., Cleveland, TN (US)

(72) Inventors: Bryan Yielding, Riceville, TN (US); Brian Polgrean, Ephrata, PA (US); Nathan Langford, Athens, TN (US)

(73) Assignee: HEIL TRAILER INTERNATIONAL, LLC, Cleveland, TN (US)

( * ) Notice: Subject to any disclaimer, the term of this patent is extended or adjusted under 35 U.S.C. 154(b) by 747 days.

(21) Appl. No.: 14/467,763

(22) Filed: Aug. 25, 2014

(65) Prior Publication Data

US 2016/0052708 A1    Feb. 25, 2016

(51) Int. Cl.
   *B65D 88/74*  (2006.01)
   *B23K 26/28*  (2014.01)
   (Continued)

(52) U.S. Cl.
   CPC .......... *B65D 88/744* (2013.01); *B23K 26/242* (2015.10); *B23K 26/28* (2013.01);
   (Continued)

(58) Field of Classification Search
   CPC ...... B65D 88/744; B65D 88/745; B65D 9/08; B65D 88/128; B23K 2201/12; B23K 2201/185; B23K 26/28; B23K 26/242; B23K 26/32; B23K 2103/04; B23K 2103/05; B23K 2103/10; B60P 3/2295
   (Continued)

(56) References Cited

U.S. PATENT DOCUMENTS

| 4,484,623 A | * | 11/1984 | Rowe | F25B 39/04 165/164 |
| 4,835,357 A | | 5/1989 | Schalk | |
| 5,174,928 A | * | 12/1992 | Cheng | B01J 10/02 165/115 |
| 6,460,614 B1 | * | 10/2002 | Hamert | B01J 19/0013 165/133 |

(Continued)

FOREIGN PATENT DOCUMENTS

| WO | WO 97/32748 | * | 9/1997 |
| WO | WO199732748 A1 | | 9/1997 |
| WO | WO 2012159856 A1 | | 11/2012 |

OTHER PUBLICATIONS

International Search Report and Written Opinion dated Nov. 30, 2015, International PCT Application No. PCT/US15/46745.

*Primary Examiner* — Steven B McAllister
*Assistant Examiner* — Benjamin W Johnson
(74) *Attorney, Agent, or Firm* — McGuireWoods LLP

(57) ABSTRACT

A temperature-controlled tank body having an integrated heat transfer panel is disclosed. The tank body may be mounted to a truck, trailer, or other mobile equipment and used for transporting a fluid at a temperature that is greater than that of the ambient environment. In an illustrative embodiment, the tank includes a barrel segment having a first sheet and an adjacent second sheet. The first sheet is joined to the second sheet along a first edge and a second, opposing edge. The first sheet is also joined to the second sheet at a plurality of locations between the first edge and second, opposing edge and enclosed at the ends to form a fluidly-sealed area. The tank includes a fluid inlet to facilitate pressurization of the fluidly-sealed area to generate a hydroformed cavity between the first sheet and the second sheet.

9 Claims, 7 Drawing Sheets

(51) Int. Cl.
    *B60P 3/22*      (2006.01)
    *B65D 88/12*     (2006.01)
    *B23K 26/32*     (2014.01)
    *B23K 26/242*    (2014.01)
    *B65D 90/08*     (2006.01)
    *B23K 101/12*    (2006.01)
    *B23K 101/18*    (2006.01)
    *B23K 103/04*    (2006.01)
    *B23K 103/10*    (2006.01)

(52) U.S. Cl.
    CPC ............ *B23K 26/32* (2013.01); *B60P 3/2295* (2013.01); *B65D 88/128* (2013.01); *B65D 90/08* (2013.01); *B23K 2101/12* (2018.08); *B23K 2101/185* (2018.08); *B23K 2103/04* (2018.08); *B23K 2103/05* (2018.08); *B23K 2103/10* (2018.08)

(58) Field of Classification Search
    USPC ............. 122/15.1, 18.1, 19.1, 19.2; 62/53.2; 165/172–178
    See application file for complete search history.

(56) References Cited

U.S. PATENT DOCUMENTS

| | | |
|---|---|---|
| 2002/0195019 A1 | 12/2002 | Woodall |
| 2005/0189791 A1 | 9/2005 | Chernoff et al. |
| 2012/0061512 A1* | 3/2012 | Stulc ................ B64C 1/069 244/118.5 |

* cited by examiner

TANK TRAILER HAVING INTEGRATED HEAT PANELS

BACKGROUND

Vehicular trailer tanks having heat transfer capabilities may be used to transport certain types of products, including, for example, liquids and gases that should be maintained at low or high temperatures relative to the external environment. Such temperature-controlled trailer tanks may be attached to trailers for trucks or other vehicles to transport heated or cooled products. Typical temperature-controlled trailer tanks include a barrel-shaped trailer body that includes a heat exchanger attached to the trailer body. The heat exchanger may be adhered to the trailer body and coupled to a fluid circulation system that circulates a heated fluid through the heat exchanger to heat the contents of the trailer body.

BRIEF DESCRIPTION OF THE DRAWINGS

Illustrative embodiments of the present invention are described in detail below with reference to the attached drawing figures, which are incorporated by reference herein, wherein.

Figure 1:
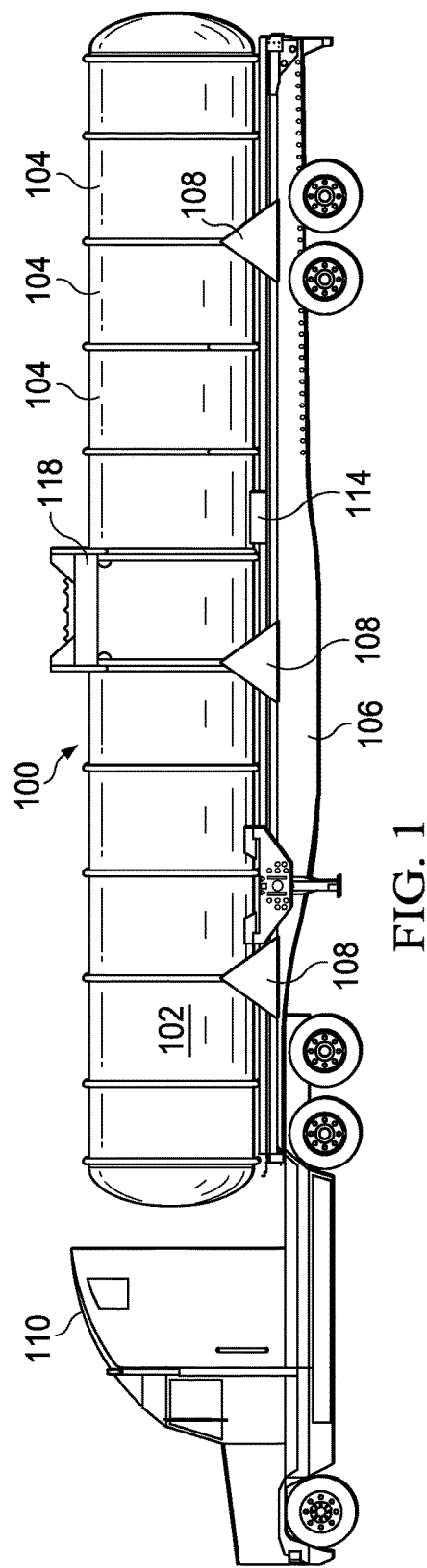
FIG. 1 is a schematic, side view of a tank trailer having an integrated heat panel.

The illustrated figures are only exemplary and are not intended to assert or imply any limitation with regard to the environment, architecture, design, or process in which different embodiments may be implemented.

SUMMARY

In accordance with an illustrative embodiment, a process for forming a tank body having an integrated heat panel includes forming a barrel segment. The step of forming a barrel segment includes placing a first sheet adjacent a second sheet, the first sheet having a first side that faces away from the second sheet, and joining the first sheet to the second sheet along at least a first edge of the first sheet and a second, opposing edge of the first sheet. The step of forming the barrel segment also includes joining the first sheet to the second sheet at a plurality of locations between the first edge and second, opposing edge to form a fluidly-sealed area between the first edge and second, opposing edge and between the first sheet and the second sheet, and forming the second sheet into the cross-sectional shape of the barrel segment. The process for forming the tank body having an integrated heat panel further includes coupling a fluid inlet to the fluidly-sealed area and supplying a pressurized fluid to the fluid inlet to deform the first sheet and increase the volume of the fluidly-sealed area to form a fluid flow path through the fluidly-sealed area.

In accordance with another illustrative embodiment, a tank body includes a barrel segment that has a first sheet adjacent a second sheet. The first sheet has a first side that faces away from the second sheet, and the first sheet is joined to the second sheet along at least a first edge of the first sheet and a second, opposing edge of the first sheet. The first sheet is also joined to the second sheet at a plurality of locations between the first edge and second, opposing edge to form a fluidly-sealed area between the first edge and second, opposing edge and between the first sheet and the second sheet. The tank body also includes a fluid inlet coupled to the fluidly-sealed area, which may be a hydroformed structure defining a cavity between the first sheet and the second sheet.

In accordance with another illustrative embodiment, a temperature-controlled tank for transporting a fluid that is at a temperature that is greater than the ambient temperature of the environment surrounding the tank includes a barrel segment. The barrel segment includes a first sheet adjacent a second sheet, the first sheet having a first side that faces away from the second sheet. The first sheet is joined to the second sheet along at least a first edge of the first sheet and a second, opposing edge of the first sheet. Further, the first sheet is joined to the second sheet at a plurality of locations between the first edge and second, opposing edge to form a fluidly-sealed area between the first edge and second, opposing edge and between the first sheet and the second sheet. A fluid inlet is coupled to the fluidly-sealed area, which includes a hydroformed structure that defines a cavity between the first sheet and the second sheet. A heat transfer medium is disposed within the cavity.

DETAILED DESCRIPTION OF THE DRAWINGS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As noted above, certain products that are transported by bulk tanks may be transported and maintained at elevated temperatures in tank trailers, truck-mounted tanks, shipping containers, and tanks mounted to other mobile equipment. For the purposes of illustration, the systems and methods described here are described with regard to a truck tank trailer, but may be similarly implemented in such other mobile equipment, including truck-mounted tanks and other shipping containers. To maintain the elevated temperature within the tank during transport, heat may be applied to a portion of the barrel that forms the bulk tank body, which may be a bulk tank trailer body, a truck-mounted tank, a shipping container tank, or a tank that is configured for mounting to other mobile equipment. Certain other transported products may not be heated during transport but may instead be heated upon unloading to improve the product's viscosity and allow it to flow more easily from the bulk tank. To supply heat to the product, some temperature-controlled tanks may have a heating system affixed to the barrel structure that forms the trailer body.

Examples of such heating systems include channel systems or dimple heat panel systems that are used to circulate a heat transfer medium, which may be a fluid such as a heated glycol or steam, to carry heat to the product stored within the bulk tank trailer. The heat transfer medium may be continuously circulated through the heating system during operation to maintain a minimum average temperature of a heat transfer medium and to remove lower temperature heat transfer medium from the tank for reheating.

Channel heat systems use lengths of 'C' channel welded to the bottom of the trailer barrel, and may include three rows of C-channel with a space approximately equal to the channel width between each channel to allow for welding the channel legs to the barrel. The channels may be capped at the ends to create a closed cavity, and inlet and outlet ports that may be installed to the cavity to facilitate circulating heated heat transfer medium to the channel and to remove (relatively) cooled heat transfer medium from the channel.

Dimple heat systems use a dimpled heat panel that is formed by stamping or a similar manufacturing process and welded to an exterior surface of the trailer barrel. For example, the dimpled heat panel may be formed from sheet metal that has dimples pressed into the sheet using a specially made die and the longitudinal edges bent at an angle to allow the edges to be on the same arc as the external surface of the barrel of the trailer body. In forming a dimpled heat panel, a hole is also punched in the center of each dimple to provide an area where the dimpled heat panel may be welded to the exterior surface of the trailer tank. It is noted that typical dimpled heat panels range from 15 inches to 24 inches wide and may have other dimensions in consideration of the application in which the dimpled heat panel is being used.

In a dimpled heat system, the dimpled panels are welded to the barrel along each longitudinal edge and plug welded at the holes corresponding to each dimple. Unlike the channel heat system, heat transfer occurs across the entire width of the panel. To reduce the labor costs of installing dimpled heat systems, discreet heat jackets may alternatively be strapped or bonded to the trailer barrel using a thermal substrate.

A temperature-controlled trailer for transporting a fluid that is at a temperature that is greater than the ambient temperature of the environment surrounding the trailer is disclosed below. The trailer body includes an integral heat panel that is similar, in terms of the ability to transmit heat, to the dimpled heat systems described above. In accordance with an illustrative embodiment, the trailer includes a barrel segment having a first sheet and a second sheet arranged adjacent to one another. The sheets may be, for example, stainless steel, aluminum or a type of sheet metal having similar properties. The first sheet has a first side that faces away from the second sheet, and is joined to the second sheet along a first edge of the first sheet and a second, opposing edge of the first sheet. In addition, the first sheet is joined to the second sheet at a plurality of locations between the first edge and second, opposing edge to form a fluidly-sealed area between the first edge and second, opposing edge and between the first sheet and the second sheet. Each such location may be a laser-welded circular weld. The trailer further includes a fluid inlet coupled to the fluidly-sealed area. In an embodiment, the fluidly-sealed area is a hydroformed structure that defines a cavity between the first sheet and the second sheet.

The trailer may further include a heat transfer medium disposed within the cavity. The heat transfer medium may be heated and circulated through the cavity to provide heat to and maintain the temperature of the contents of the trailer if a thermostat within the trailer tank or cavity indicates a temperature reading that is below a selected threshold. In addition, the trailer may include a fluid outlet coupled to the fluidly sealed area, or cavity, and a heat source thermodynamically coupled to the heat medium and arranged along a fluid flow path formed (in part) by the fluid inlet, the fluidly-sealed area, and the fluid outlet. The heat source may be a heat exchanger coupled to a vehicle's engine, a steam system, an electrical heating element, a combination thereof, or any other suitable heater, and is configured to provide heated heat transfer media to the fluid inlet. The heat transfer media may be steam, glycol, or any other suitable media.

In accordance with another illustrative embodiment, a temperature-controlled tank body includes a barrel segment that has a first sheet disposed adjacent a second sheet. The first sheet has a first side that faces away from the second sheet and, in an embodiment, away from interior of the barrel body with the barrel body is formed. The first sheet is joined to the second sheet along at least a first edge of the first sheet and a second, opposing edge of the first sheet. The first sheet is also joined to the second sheet at a plurality of locations between the first edge and second, opposing edge to form a fluidly-sealed area between the first edge and second, opposing edge and between the first sheet and the second sheet. The trailer body further includes a fluid inlet coupled to the fluidly-sealed area, which comprises a hydroformed structure that defines a cavity between the first sheet and the second sheet.

In an embodiment, the tank body includes one or more additional barrel segments. In such an embodiment, the barrel segment may be a first barrel segment, and the tank body may further include a second barrel segment substantially identical to the first barrel segment. Each of the barrel segments comprises a first end and a second end, and the second end of the first barrel segment is joined to the first end of the second barrel segment, such that the first edge of the first sheet of a first barrel segment is approximately aligned with the first edge of the first plate of a second barrel segment. A splice plate is joined to the first side of the first sheet of a first barrel segment such that a first edge of the splice plate is substantially aligned with the first edge of the first sheet of the first barrel segment and a second edge of the splice plate is substantially aligned with a second edge of the second sheet of the first barrel segment. Additionally, the splice plate is joined to the first side of the first sheet of a second barrel segment such that a first edge of the splice plate is substantially aligned with the first edge of the first sheet of the second barrel segment and a second edge of the splice plate is substantially aligned with a second edge of the second sheet of the second barrel segment. In an embodiment, the first sheet is joined to the second sheet by a plurality of welds, which may be, for example, laser welds.

When formed, the fluidly sealed area may have a substantially uniform height at a plurality of interstitial points between such plurality of locations, and a fluid outlet may be coupled to the fluidly sealed area. As such, the tank body includes a fluid flow path from the fluid inlet to the fluid outlet to facilitate to flow of a heat transfer media through the fluidly sealed area, or cavity, to provide heat to the contents of the trailer.

Turning now to the figures, FIG. 1 shows a schematic, side view of a tank trailer 100 attached to a truck 110 for towing. The tank trailer 100 may be a temperature-controlled tank trailer, such as a heated tank trailer that includes a temperature control system and an associated heater or cooler. The tank trailer 100 includes a tank body 102 formed by one or more barrel segments 104. The tank body 102 is attached to the chassis 106 of the trailer at a plurality of supports 108 or attachment structures, and a heating system 114 is supplied to provide heat and control the temperature of the contents of the tank trailer 100. The heating system may include a heat panel that is formed integrally to the tank body, as described in more detail below.

Figure 2:
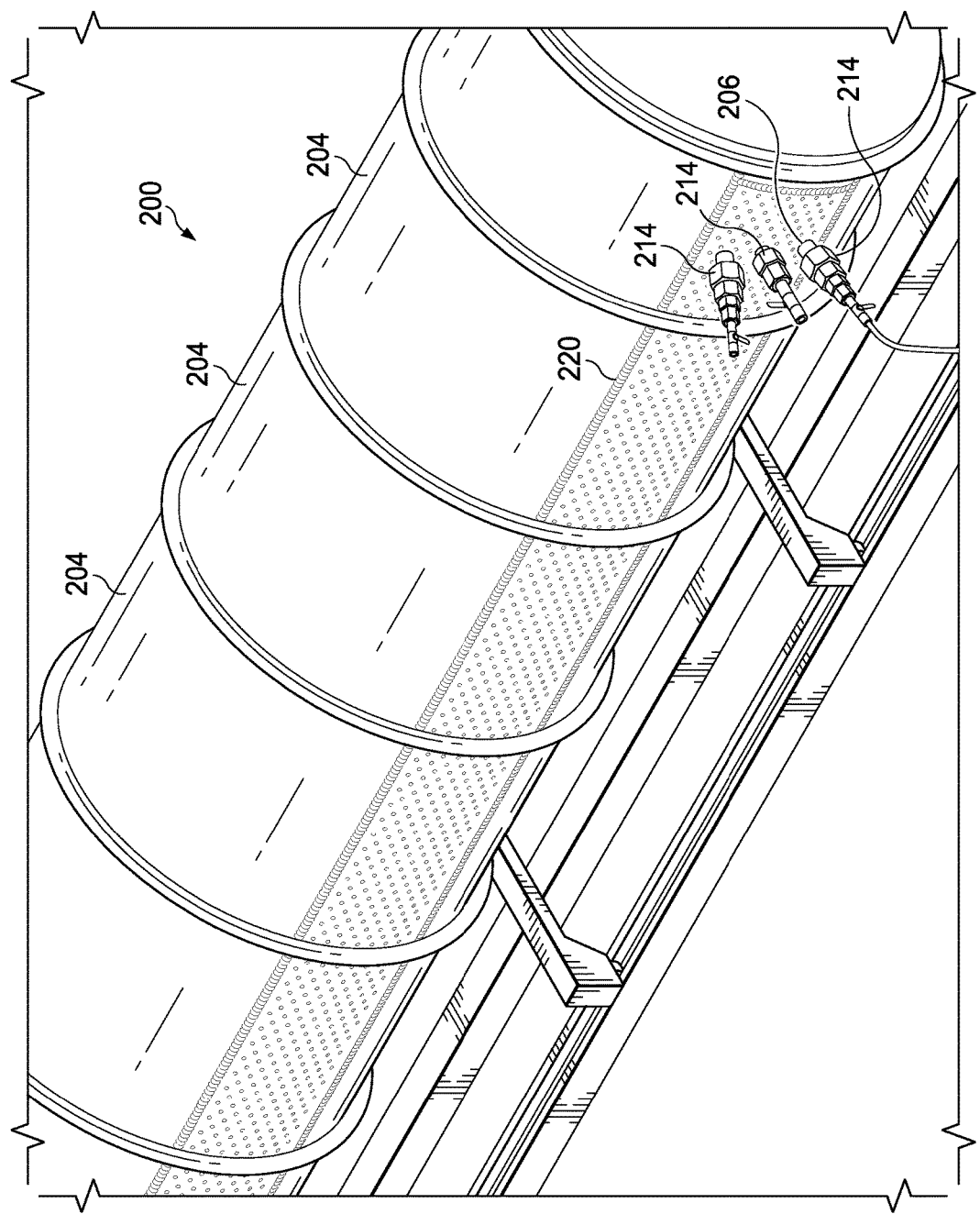
FIG. 2 is a schematic, plan view of a portion of the tank trailer of FIG. 1.
Figure 2B:
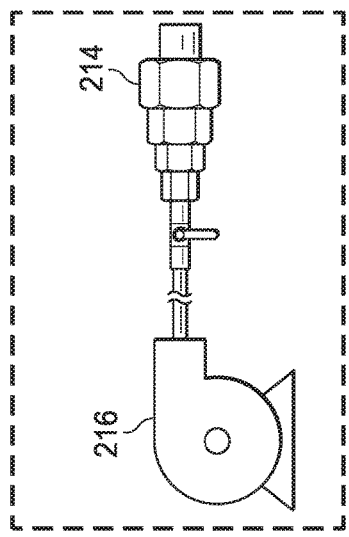
FIG. 2B shows a detail view of a portion of the tank trailer shown in FIG. 2.

FIG. 2 is a plan view showing a portion of a trailer tank 200 in the formation process. The tank trailer 200 is rolled partially onto its side to reveal an integrated heat panel 220. In an embodiment, the integrated heat panel 220 spans across a plurality of barrel segments 204. The integrated heat panel 220 is formed by the barrel segment 204, or layers of sheet metal that form the barrel segments 204 and separate sheets on the exterior of the trailer tank 200 and adjacent the layer that forms the barrel segment 204. The separate sheets may be spliced and welded together, using a laser welding process, for example, and deformed using a hydroforming process to form the integrated heat panel 220. To facilitate the hydroforming process, one or more of the barrel segments 204 may include nipples 214 that act as fluid inlets and outlets to the heat panel 220. The nipples 214 may be installed in the layer of material that forms the outer layer of the heat panel prior to formation of the heat panel so that after the layer of sheet is joined to the outer surface of the barrel, a pressurized fluid may be delivered through the nipple to induce the formation of a fluidly sealed cavity between the wall of the barrel segment and the separate layer of sheet. During formation, the nipples may be coupled to a hydrostatic pressure source, such as a pump 216, via hoses that are coupled to the nipples 214 to deliver pressurized fluid to form the cavity.

Figure 3:
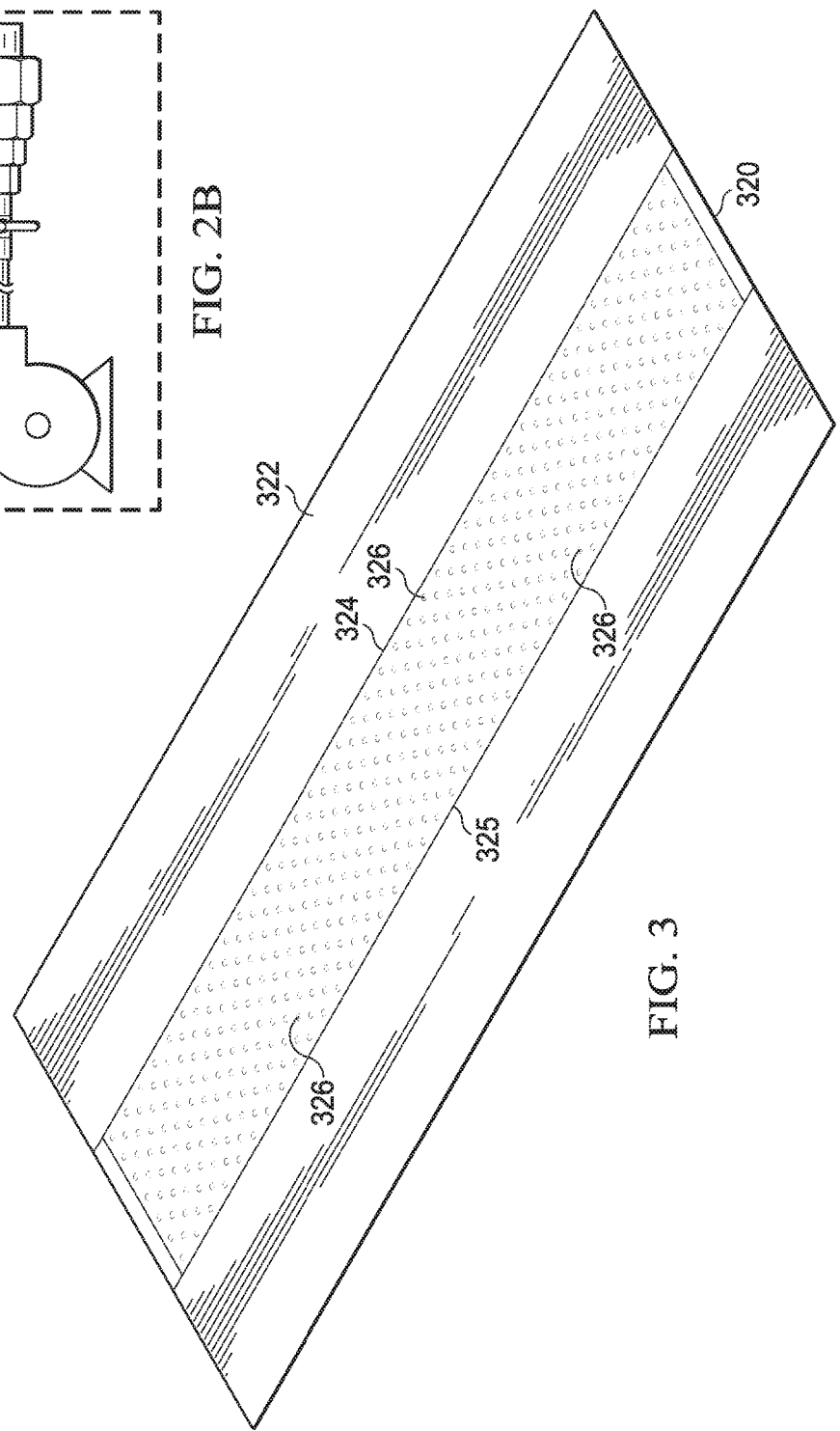
FIG. 3 is a schematic, plan view of a portion of a barrel segment of the tank trailer of FIG. 1 that includes a portion of the heat panel in an unassembled state.

FIG. 3 shows a portion of a barrel segment that includes a portion of the heat panel in an unassembled state. The portion of the barrel includes a first sheet 320, and a second sheet 322. Each of the first and second sheet 320, 322 may be an aluminum sheet, a stainless steel sheet, or any other suitable material. In an embodiment, the first sheet 320 is welded to the second sheet 322 along a first edge 324 and second edge 325 using, for example, a laser welding process. The portion of the barrel segment may also include a plurality of circular welds 326 arranged at a plurality of locations. In an embodiment, the locations of the circular welds may correspond to a grid or other regular spacing pattern such that a plurality of the circular welds 326 are equidistant from one another.

Figure 4:
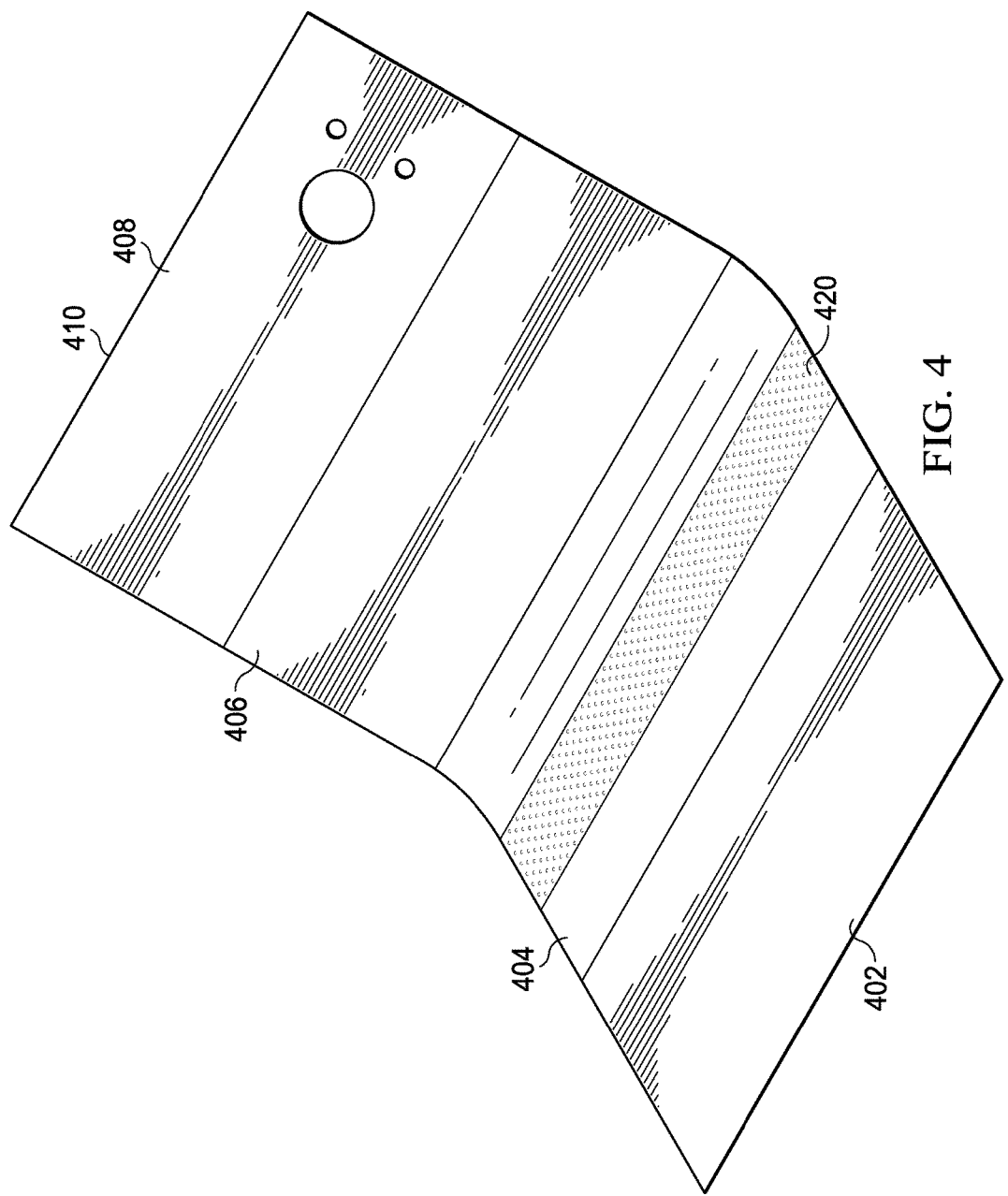
FIG. 4 is a schematic, plan view of a portion of a barrel segment of the tank trailer of FIG. 1 that shows a plurality of portions of the barrel segment arranged to be rolled into the form of the barrel segment.

FIG. 4 shows a plurality of portions of a barrel segment 410 arranged to form the barrel segment 410. Here, four panels 402, 404, 406, and 408 are joined together and rolled to form the barrel segment 410. The panels 402, 404, 406, and 408 may be joined by seam welding or any other suitable method of joining. The second panel 404 is analogous to the second sheet 322 described above with regard to FIG. 3, and as such includes an attached first sheet 420 that is analogous to the first sheet 320 which after rolling, is located on the exterior of the barrel segment. The panels 402, 404, 406, and 408 may be formed from sheet metal that is cut or formed to a desired length, width, and thickness. Although four panels are shown in FIG. 4, it is noted that any suitable number of panels may be used, including as few as one panel, depending on the dimensions of the panel and the desired dimensions of the barrel section.

It is noted that, with regard to the completed trailer body and heat panel, segments 410 that form intermediate segments of the heat panel may include first sheets 420 that span nearly the entire length of the panel 404 and are left unwelded at the ends (which will be spliced, as described below), whereas segments 410 that form the distal ends of the heat panel will be truncated and welded to enclose the ends of the heat panel.

Figure 5:
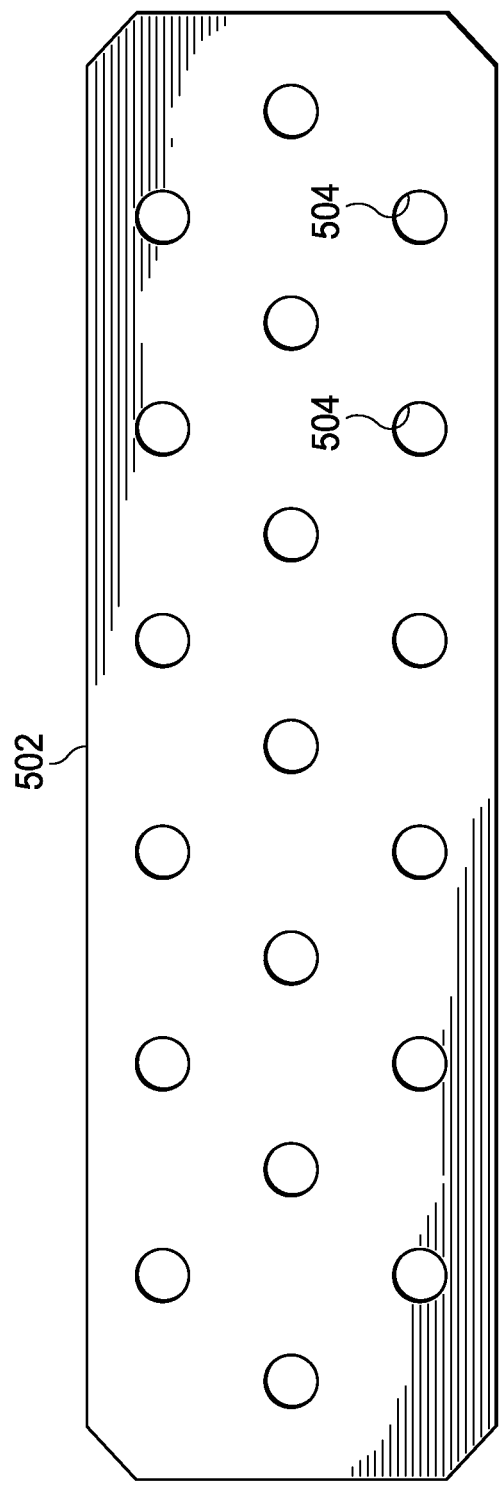
FIG. 5 is a schematic, top view of a splice plate that may be used to join together a surface of segment of an integrated heat panel.

The panels 402, 404, 406, and 408 may be constructed from steel, aluminum, stainless steel, or any other suitable metal. Once constructed and rolled into the shape of the trailer body, the barrel segments may be arranged end to end and welded together to form the tank body, and enclosed at each end to form a tank. The portions of the segments that form the heat panel may be connected together using a splice plate that couples the first sheets 420 to one another. An example of such a splice plate 502 is shown in FIG. 5. The splice plate 502 is a piece of sheet metal that may be selected from the same material used to form the first sheets 320 and 420 described with regard to FIGS. 3 and 4, respectively. The splice plate 502 is sized to overlay the ends of adjacent barrel segments 410 to form a junction between the first sheets 420. In an embodiment, the splice plates 502 and adjacent first sheets 420 may include cutouts, chamfers or other complementary geometric features (such as grooves or notches) that cause the splice plates 502 to fit together with the first sheets 420 or to assist with welding. In addition, each splice plate 502 may include a plurality of holes 504 that are spaced similarly to the spacing of the circular weld locations described above.

Figure 6:
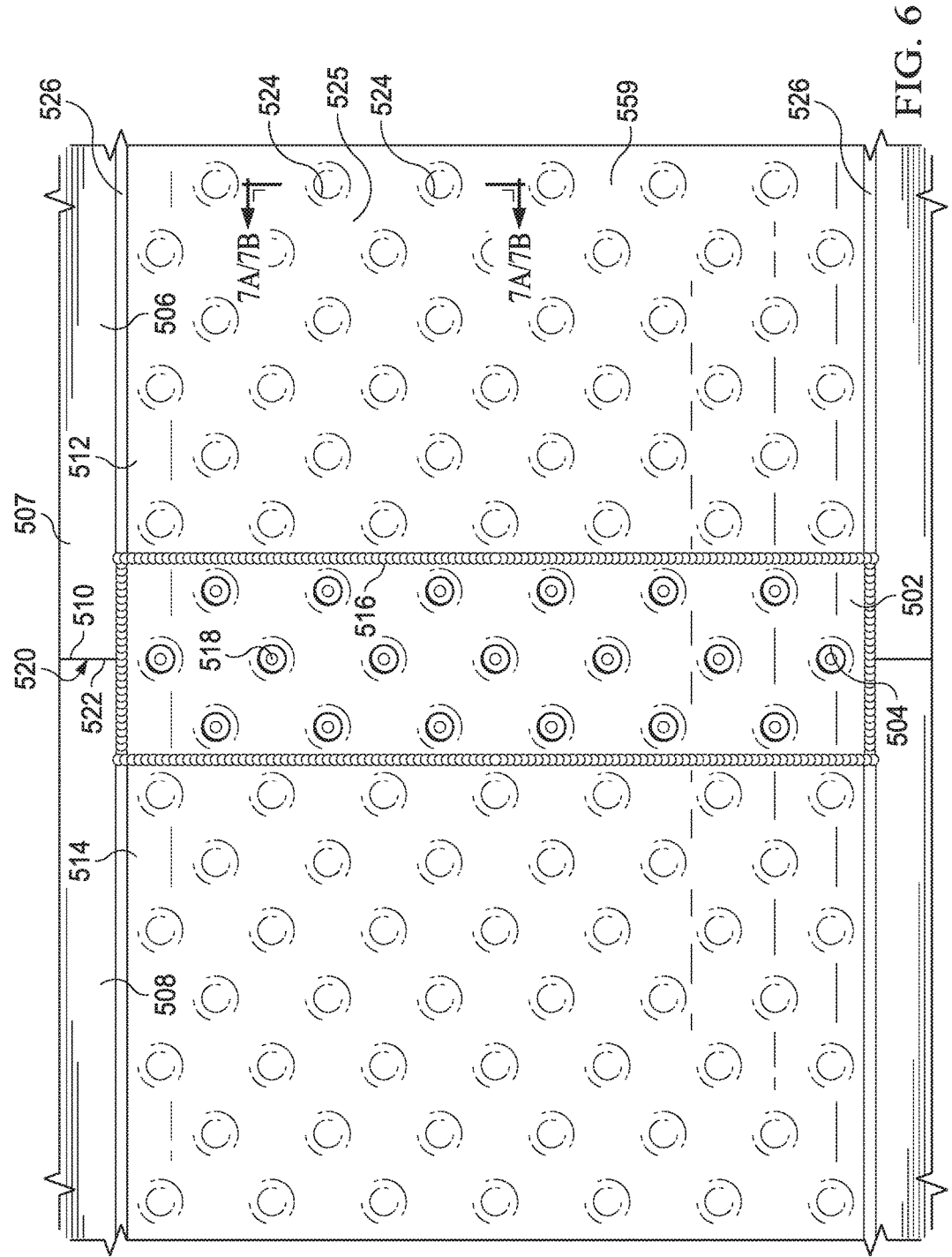
FIG. 6 is a schematic, partial view of a first barrel segment being assembled to a second barrel segment, and a portion of a heat panel structure of the first barrel segment being coupled to the heat panel structure of the second barrel segment.

FIG. 6 shows an installed splice plate 502, and more particularly, a first end 520 of second barrel segment 507 abutted to a second end 522 of a first barrel segment 508 and joined together by, for example, a seam weld 510. The splice plate 502 is arranged to overlay or abut a first sheet 514 of the first barrel segment 508 and a first sheet 512 of the second barrel segment 507. The splice plate also substantially aligns with the edges of the first sheets 512, 514 to form a common upper and lower boundary of the fluidly-sealed area. The splice plate 502 is joined to the first sheets 512, 514 and barrel segments 507, 508 about its perimeter by, for example, welds 516. The splice plate 502 is also welded to the first barrel segment 508 and second barrel segment 507 by welds or similar joints at the circumference of each of the holes 504. FIG. 2. shows a trailer tank 200 following the aforementioned assembly and prior to inflation of the heat panels according to an illustrative embodiment, wherein the heat panel is prepared for the step of hydroforming the cavity.

Figure 7A:
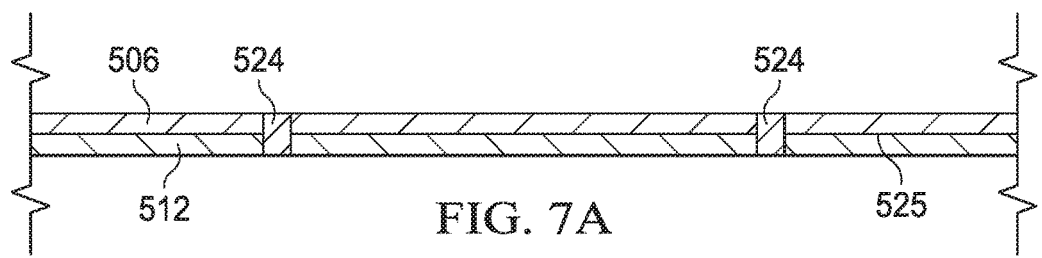
FIG. 7A is a cross-section view of the heat panel structure of FIG. 6 in a first state prior to the addition of a pressurized fluid.
Figure 7B:
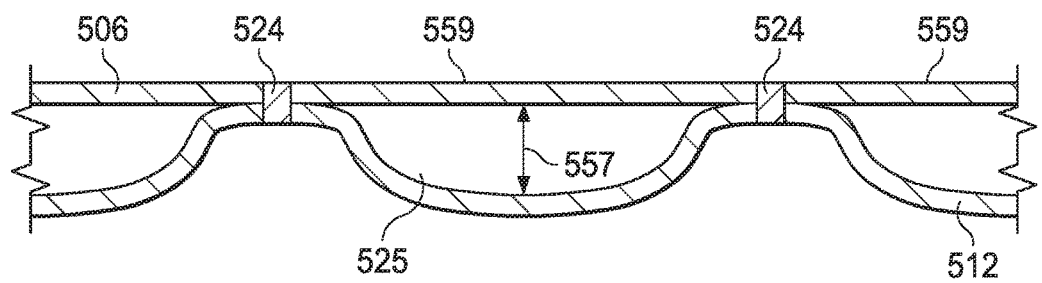
FIG. 7B is a cross-section view of the heat panel structure of FIG. 6 in a second, deformed state following the addition of pressurized fluid to the sealed area.

FIG. 7A shows a cross-section of the heat panel in a first state prior to the addition of a pressurized fluid to the sealed area 525 and FIG. 7B shows a cross-section of the heat panel in a second, deformed state following the addition of pressurized fluid to the sealed area 525. As shown in FIG. 7A, a cross section of the heat panel includes a first sheet 512 joined to a second sheet 506 at welds 524, 526 (as shown in FIG. 6). While the first sheet 512 is adjacent the second sheet 506, the two sheets are only fixed relative to each other at the locations of the circular welds 524 and about the perimeter of the first sheets 512. In this state, an uninflated fluidly sealed area 525 exists between the welds 524, 526.

In an embodiment, the integrated heat panel (220 of FIG. 2) is formed by applying a pressurized fluid, such as water, through a fluid inlet that is coupled to the fluidly sealed area 525 until the pressure differential between the fluidly sealed area 525 and the ambient pressure results in an inflating force that causes deformation of the first sheet, thereby forming a cavity at the fluidly sealed area 525. In some embodiments, the second sheet 506 may also be configured to deform when subjected to the inflating force. Pressure in the cavity may be increased until the areas between the circular welds 524 expand to a desired height 557, which may be substantially uniform across the body of the heat panel at the interstitial locations or points 559 between the circular welds 524. In operation, a fluid inlet and a fluid outlet may be coupled to the cavity at one or more locations in the same manner as the nipple described above. For example, a fluid inlet may be coupled to the cavity at one end of the heat panel and the fluid outlet may be coupled to the cavity at a second, opposing end of the heat panel to facilitate the flow of a heated substance or medium, such as (for example) steam or heated glycol, through the cavity to heat or maintain the temperature of a tank trailer.

An illustrative process for forming a tank trailer having an integrated heat panel in accordance with the structures described above with regard to FIGS. 1-7B is further described below. In accordance with an illustrative embodiment, a process for forming a tank body having an integrated heat panel includes forming a barrel segment. This step may include selecting sheet metal panels that will form the barrel segment and seam welding the panels together, as shown in FIGS. 3 and 4. One of the panels is selected to be a second sheet in the formation of the integrated heat panel, as described below. Once the panels are joined together (and before or after the steps recited below), the panels may be rolled or otherwise shaped into the desired cross-section of the tank body, which may be round, circular, elliptical, or any other suitable shape. The barrel segments may be enclosed by ribbing, tubing, or similar internal or external supports that help to maintain the cross section of the barrel segments in the desired shape.

Formation of the heat panel portion of the barrel segment includes placing a first sheet adjacent a second sheet and joining the first sheet to the second sheet along the edges of the first sheet. The joining process may include laser welding, traditional welding, or any other joining process that results in formation of a joint of sufficient strength along the edges of the first sheet. The joining process is repeated at a plurality of locations which may be, for example, circular welds as described previously. In an embodiment in which a single barrel segment is used, the first sheet may also be joined to the second sheet at each end to form a fluidly-sealed area between the first sheet and second sheet. In an embodiment in which multiple barrel segments are used, the first sheet may be joined to first sheets of adjacent barrel segments by a splicing panel to create an aggregated first sheet, or outer sheet of the integrated heat panel, which is then sealed at the ends using the aforementioned joining process to form a fluidly sealed area that spans the multiple barrel segments.

In an embodiment, a fluid inlet is coupled to the fluidly sealed area. The fluid inlet may be a preinstalled aperture or fitting in one of the first sheet and/or second sheet. A hydrostatic pressure source and fluid source, which may be, for example, a hydrostatic pump, is coupled to the fluid inlet to supply pressurized fluid (which may be, for example, water) to the sealed area. The pressurized fluid deforms and expands the first sheet and second sheet, thereby expanding the fluidly-sealed area to form the cavity. In an embodiment, the first sheet and second sheet may be formed of different material thickness so that one of the sheets may expand more than the other. For example, in an embodiment in which the second sheet is much thicker than the first sheet, the application of hydrostatic pressure may result in permanent deformation of only the first sheet. In another embodiment, the first sheet and second sheet may have approximately equal wall thicknesses and may therefore deform equivalently in response to the application of increased hydrostatic pressure. In an embodiment, a fluid outlet may also be coupled to the fluidly-sealed area at the opposite end of the fluid inlet so that the cavity will form a fluid flow path from the fluid inlet to the fluid outlet.

In an embodiment that includes multiple barrel segments, an illustrative process further includes forming a second barrel segment substantially identical to the barrel segment described above, and joining the barrel segments end to end, as shown in FIG. 6. Joining the barrel segments may include aligning the first sheets of each segment and connecting the first segments using a splice plate, as described above. The splice plates are joined to adjacent first sheets of the adjacent barrel segments and joined to the first sheets. The splice plates may also include holes that have spacing equivalent or nearly equivalent to the circular welds described above, so that the splice plates may be joined to the second sheets of the barrel segments about the inner perimeter of each hole and along the edges of the splice plate that do not join the first sheets. It is noted that while the circular welds and holes shown in the figures are generally circular, other shapes may instead be used where appropriate or desired.

In a completed trailer, a heat transfer medium such as steam or heated glycol may be supplied from a heat source to the fluid inlet of the heat panel and circulated through the cavity to provide heat to and maintain the temperature of the contents of the trailer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

It should be apparent from the foregoing that an invention having significant advantages has been provided. While the invention is shown in only a few of its forms, it is not limited to only these embodiments but is susceptible to various changes and modifications without departing from the spirit thereof. For example, the tank body described above may instead be a truck-mounted tank, a shipping container tank or a tank configured for mounting to other mobile equipment.

We claim:

1. A process for forming a tank trailer body having an integrated heat exchange panel, the process comprising:
   forming a plurality of enclosed barrel segments of the tank trailer body, wherein forming each enclosed barrel segment of the plurality of enclosed barrel segments includes:

(a) placing a first sheet adjacent a second sheet, the second sheet having a width that corresponds to a perimeter of the enclosed barrel segment of the tank trailer body and the first sheet having a width that corresponds to a heat exchange panel and is substantially less than the width of the second sheet, and wherein the first sheet has a first side that faces away from the second sheet;

(b) arranging the first sheet on the second sheet such that a first edge of the first sheet is offset from a first edge of the second sheet, and such that a second, opposing edge of the first sheet is offset from a second, opposing edge of the second sheet;

(c) joining the first sheet to the second sheet along at least the first edge of the first sheet and the second, opposing edge of the first sheet;

(d) joining the first sheet to the second sheet at a plurality of locations between the first edge of the first sheet and the second, opposing edge of the first sheet to form a fluidly-sealed area between the first sheet and the second sheet, and between the first edge of the first sheet and the second, opposing edge of the first sheet;

(e) shaping the second sheet into a cross-sectional shape of the enclosed barrel segment;

(f) coupling a fluid inlet to the fluidly-sealed area formed using step (d); and (g) supplying a pressurized fluid to the fluid inlet to deform the first sheet and increase the volume of the fluidly-sealed area;

wherein each enclosed barrel segment of the plurality of enclosed barrel segments formed using steps (a)-(g) comprises a first end and a second, opposing end, the process further comprising:

opening an end of the fluidly-sealed area of a first barrel segment;

opening an end of the fluidly-sealed area of a second barrel segment;

aligning the opened end of the fluidly-sealed area of the first barrel segment with the opened end of the fluidly-sealed area of the second barrel segment;

overlaying a splice plate over the opened end of the fluidly-sealed area of the first barrel segment and the opened end of the fluidly-sealed area of the second barrel segment;

joining the splice plate to the first side of the first sheet of the first enclosed barrel segment such that a first edge of the splice plate is substantially aligned with the first edge of the first sheet of the first enclosed barrel segment and a second edge of the splice plate is substantially aligned with t second opposing edge of the first sheet of the first enclosed barrel segment;

joining the splice plate to the first side of the first sheet of the second enclosed barrel segment such that a first edge of the splice plate is substantially aligned with the first edge of the first sheet of the second enclosed barrel segment and a second edge of the splice plate is substantially aligned with the second opposing edge of the first sheet of the second enclosed barrel segment;

wherein the splice plate creates a seal between the fluidly-sealed area of the first barrel segment and the fluidly-sealed area of the second barrel segment to allow fluid to flow between the fluidly-sealed area of the first barrel segment and the fluidly sealed area of the second barrel segment.

2. The process of claim 1, wherein forming the plurality of enclosed barrel segments further comprising:
welding the first sheet to the second sheet along at least the first edge of the first sheet and the second, opposing edge of the first sheet; and
welding the first sheet to the second sheet at a plurality of locations between the first edge of the first sheet and the second, opposing edge of the first sheet.

3. The process of claim 1, wherein forming the plurality of enclosed barrel segments further comprising:
laser welding the first sheet to the second sheet along at least the first edge of the first sheet and the second, opposing edge of the first sheet; and
laser welding the first sheet to the second sheet at a plurality of locations between the first edge of the first sheet and the second, opposing edge of the first sheet.

4. The process of claim 1, wherein supplying a pressurized fluid to the fluid inlet to deform the first sheet in step (g) comprises coupling a hydrostatic pump to the fluid inlet.

5. The process of claim 1, wherein the plurality of locations between the first edge and the second opposing edge in step (d) are spaced such that supplying a pressurized fluid to the fluid inlet to deform the first sheet results in a fluidly sealed area having a substantially uniform height at a plurality of interstitial points between such plurality of locations.

6. The process of claim 1, further comprising joining a fluid outlet to the fluidly sealed area of one of the enclosed barrel segments.

7. The process of claim 1, wherein supplying a pressurized fluid to the fluid inlet to deform the first sheet in step (g) comprises forming a fluid flow path from the fluid inlet to a fluid outlet.

8. The process of claim 1, further comprising joining a first end of the first sheet to the second sheet and joining a second end of the first sheet to the second sheet when forming the fluidly sealed area of each barrel segment.

9. The process of claim 1, further comprising joining a first end of the first sheet of the first enclosed barrel segment to the second sheet of the first barrel segment and joining a second end of the first sheet of the second barrel segment to the second sheet of the second barrel segment.

* * * * *